United States Patent [19]
Ernst

[11] Patent Number: 4,530,159
[45] Date of Patent: Jul. 23, 1985

[54] MULTICOORDINATE SENSING HEAD

[75] Inventor: Alfons Ernst, Traunreut, Fed. Rep. of Germany

[73] Assignee: Johannes Heidenhain GmbH, Traunreut, Fed. Rep. of Germany

[21] Appl. No.: 531,422

[22] Filed: Sep. 12, 1983

[30] Foreign Application Priority Data

Sep. 17, 1982 [DE] Fed. Rep. of Germany ....... 3234471

[51] Int. Cl.³ .............................................. G01B 7/28
[52] U.S. Cl. .............................. 33/169 R; 33/172 E; 33/503; 33/559
[58] Field of Search ................. 33/169, 174 L, 172 E, 33/23 K; 409/128, 127, 126

[56] References Cited

U.S. PATENT DOCUMENTS 3,673,695 7/1972 Rethwish ........................... 33/174 L
3,922,791 12/1975 Maxey et al. .................. 33/174 P X
3,991,477 11/1976 Zipin et al. ..................... 33/174 L X
4,279,080 7/1981 Nakaya .............................. 33/174 L

FOREIGN PATENT DOCUMENTS 1548326 7/1970 Fed. Rep. of Germany .
2242355 10/1974 Fed. Rep. of Germany .
2535249 2/1977 Fed. Rep. of Germany .
PCT/SU79/-
 00134 12/1979 Fed. Rep. of Germany .
2804398 12/1979 Fed. Rep. of Germany .
1932010 6/1980 Fed. Rep. of Germany .
2938080 7/1980 Fed. Rep. of Germany .
2712181 1/1981 Fed. Rep. of Germany .
3031770 3/1981 Fed. Rep. of Germany .
2946271 5/1981 Fed. Rep. of Germany .
82109605 9/1982 Fed. Rep. of Germany .
79213 1/1971 German Democratic Rep. .
1599758 10/1981 United Kingdom .

Primary Examiner—Harry N. Haroian
Attorney, Agent, or Firm—Willian Brinks Olds Hofer Gilson & Lione Ltd.

[57] ABSTRACT

A multicoordinate sensing head is disclosed in which guides are provided for guiding movement of the sensing pin in any direction in an X-Y-Z coordinate system. An axial ball guide is provided for guiding the sensing pin movement in the axial or Z direction, and guidance in the X-Y plane is accomplished by a planar surface guide having two translatory degrees of freedom. A precision stop and slide block guides operate to prevent rotation of the sensing pin. Three photoelectric measuring systems are provided for measuring deflection of the sensing pin in the X, Y and Z coordinates. The measuring scales in the X-Y plane are configured as flat grids.

11 Claims, 2 Drawing Figures

MULTICOORDINATE SENSING HEAD

BACKGROUND OF THE INVENTION

The present invention relates to a multicoordinate sensing head of the type comprising a sensing pin, a support member, and means for detecting deflection of the sensing pin.

A variety of multicoordinate sensing heads for the sensing of workpieces in several directions are known in the art. In general, such sensing heads can be subdivided into two categories. In the first category, the sensing pin is deflected angularly when it is deflected perpendicularly with respect to its axis. In the secondary category, the sensing pin is movably mounted by means of straight guides such that the axis of the sensing pin remains parallel to its original orientation under perpendicular deflection of the pin. In German patent DE-PS No. 22 42 355 there is described an electronic multicoordinate sensor which is characterized by a combination of individual features. A torsionally rigid array of play-free and friction-free linear guide systems forms a flat or spatial coordinate system. This arraying of linear guide systems one on another improves the state of the art as represented in the background portion of the specification of this patent. The system disclosed in this patent, however, still is characterized by certain disadvantages, since an arraying of spring parallelograms one on another results in one linear guide system which builds on the accuracy of the previously mounted straight guide system. In cases in which two or more linear guides are arrayed one on another (as for example on a cross table) the individual linear guide systems must be manufactured with extreme precision in order to meet necessary accuracy requirements. Such extreme precision in general results in unusually high construction and manufacturing costs. Furthermore, it is a peculiarity of linear guide systems which incorporate spring parallelograms, that, on deflection, the separation between plates which move parallel to one another changes. This effect is negligibly small only in the case of very small deflections.

SUMMARY OF THE INVENTION

The present invention is directed to an improved multicoordinate sensing head which to a large extent overcomes the disadvantages described above with respect to prior art sensing heads, yet which is nevertheless constructed in a relatively simple manner, is sturdy in use, and is usable in a versatile manner.

According to this invention, a multicoordinate sensing head of the type described initially above is provided with means for defining a support surface fixedly secured with respect to the support member. A guide member is secured to the sensing pin, and means are provided for guiding the guide member with respect to the support surface such that the guide member is movable with two degrees of translatory freedom over the support surface in a low friction, play-free manner. In addition, means are provided for preventing the sensing pin from rotating with respect to the support member.

The preferred embodiment described below provides particular advantages in that the sensing pin is guided in a plane in two degrees of freedom in a manner such that there is no reciprocal dependence on the accuracy of two individual linear guide systems. Nevertheless, the same two degrees of translatory freedom are provided. In a certain sense, the guide of the preferred embodiment described below does not utilize linear guide systems which are arrayed on one another, but rather uses a single, planar guide system. Furthermore, the preferred embodiment described below is particularly low in overall height, as a direct result of the guidance system used. Further advantageous features of this invention are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
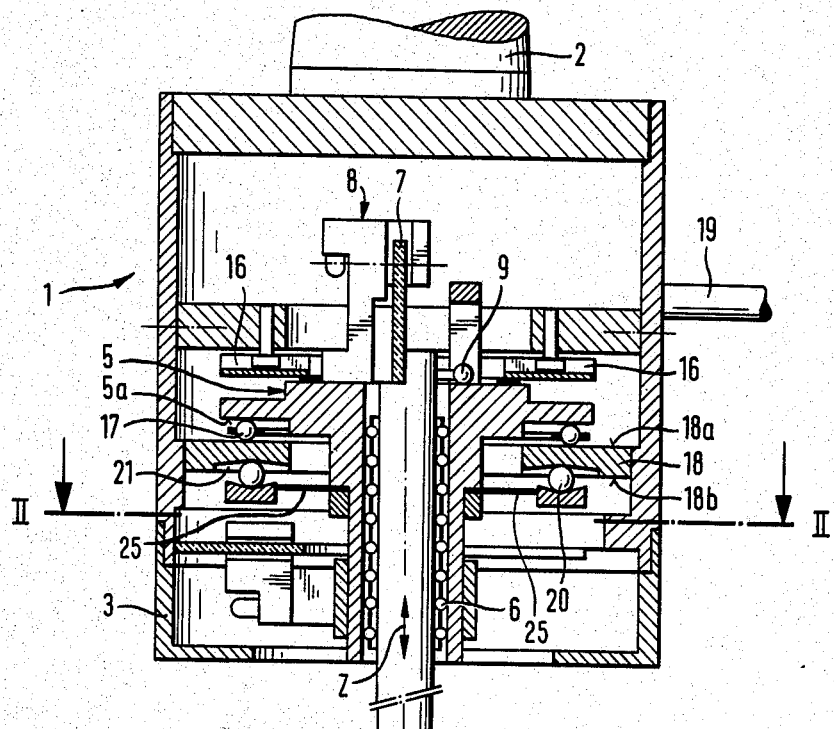
FIG. 1 is a sectional view through a sensing head which incorporates a presently preferred embodiment of this invention.
Figure 2:
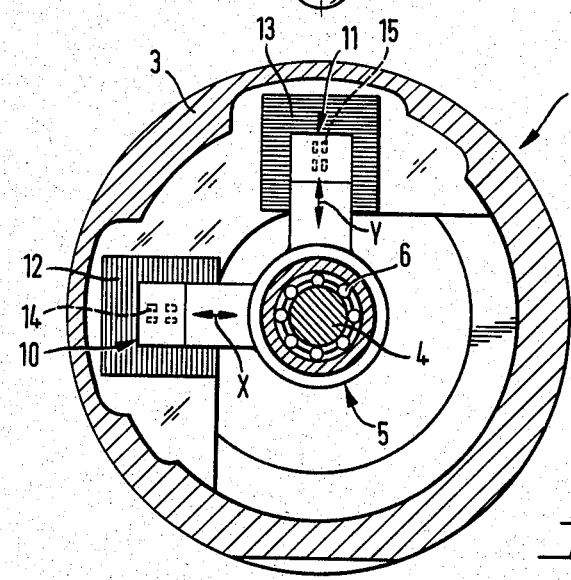
FIG. 2 is a sectional view taken along line II—II of FIG. 1.

Turning now to the drawings, FIGS. 1 and 2 show a multicoordinate sensing head 1 which incorporates a support member such as a receiving mandrel 2 for mounting the sensing head 1 in the spindle of a measuring or processing machine (not shown). The sensing head 1 includes a housing 3 and a sensing pin 4. The sensing pin 4 is mounted in the interior of the housing 3 so as to project from the housing 3, and the sensing pin 4 is deflectable in all coordinates of a spatial coordinate system. In the following description, deflection of the sensing pin 4 in the direction of the double-headed arrow marked Z in FIG. 1 is referenced as axial deflection. The sensing pin 4 is mounted with its shaft in a guide member 5 such that the sensing pin 4 is slidable axially in the guide member 5 and is free to the greatest possible extent from play and friction.

In the illustrated embodiment, this virtually play-free and friction-free bearing which mounts the sensing pin 4 to the guide member 5 includes a precision ball axial guide 6. At the end of the sensing pin 4 situated within the housing 3 there is mounted a line grid 7. This line grid 7 is oriented as an extension of the central axis of the sensing pin 4, and the line grid 7 acts as a measuring scale in a digital electric length measuring system 8. In the Z direction, the multicoordinate sensing head therefore operates according to the Abbe or comparator principle. Under the action of a spring (not shown) the sensing pin 4 after deflection in the axial direction is always reset to a predetermined rest position, which corresponds to the zero point position in the Z coordinate axis. A ball constructed as a precision stop 9 acts as a zero point stop. In addition, this ball 9 coordinates with axial guides securely mounted to the housing 3 to prevent the sensing pin 4 from twisting or rotating with respect to the housing 3.

When the sensing pin 4 is deflected in a plane perpendicular to the Z direction, such radial deflection is measured in an X-Y coordinate system by means of digital electric length measuring systems 10 and 11 (as shown in FIG. 2). The measuring scales of the length measuring system 10 and 11 are constructed as flat grids 12,13 which are fixedly secured to the housing 3. The large rectangular shape of the grids 12,13 ensures that the photoelectric sensors 14,15 secured to the guide member 5 remain in alignment with the measuring scales 12,13. Thus, even if the sensing pin 4 is deflected in the X direction, the photoelectric sensors 15 for the Y axis do not move out of alignment with the measuring scale 13 for the Y axis. A corresponding statement holds for deflection of the sensing pin in the Y direction.

In the event the sensing pin is deflected in a direction which does not exactly align with one of the X or Y coordinates, the measuring systems 10 and 11 operate to measure directional components of the sensing pin 4 deflection, so that the deflection coordinates can be determined.

The sensing pin 4 is guided for movement in the X-Y plane in a manner which is virtually as free of play and friction as in the Z direction. This precision guidance is achieved by means of a parallel plane system which restricts the guide member 5 to movement in two translatory degrees of freedom. A third degree of freedom, rotation, is prevented in a known manner by an intermediate piece which is coupled to the housing by means of two crossed slide block guides 16. Each of these guides 16 includes a slide block which travels in a slot so as to allow translation of the guide member in the X-Y plane while preventing rotation.

The guide member 5 for the sensing pin 4 includes a flange which defines an annular plate-like extension which extends into an outer zone of the interior of the housing 3. On the underside 5a of this plate, an extremely flat surface is formed, oriented perpendicularly to the axis of the axial guide 6. For example, this surface 5a can be formed by methods used to form precision optical surfaces, such as lapping methods. This surface 5a acts as a guide surface for an array of precision balls 17. A plate 18 is fixedly mounted to the housing 3 to form a support surface 18a for the array of balls 17. This support surface 18a is likewise formed by lapping methods, and the support surface 18a is planar and parallel to the guide surface 5a. The balls 17 can for example be ball bearings, and the surfaces 5a,18a are biased together in a manner described below in order to substantially eliminate play between the guide member 5 and the support surface 18a. In this way, the sensing pin 4 is guided in a plane parallel to the plane of the X-Y coordinates in a substantially play-free and friction-free manner. The sensing pin 4 by means of the guide member 5 is movable in any direction in this plane, and is restrained against twisting by the crossed slide block guides 16. The position of the sensing pin 4 in the X-Y plane is measured by the length measuring systems 10,11 described above. Measuring signals generated by these measuring systems 10,11, together with measuring signals generated by the measuring system 8 in response to deflection in the Z direction, are transferred over a cable 19 to an evaluating arrangement, which is well known to the art and therefore not shown in FIG. 1. If necessary, the measuring signals generated by the measuring systems 8,10,11, may be processed in a control system for the machine.

Of course, a wireless transmission system can be substituted for the cable 19 in order to transmit the measuring signals to a remote location.

The embodient shown in FIGS. 1 and 2 includes an arrangement for biasing the sensing pin 4 into a predetermined rest position in the X-Y plane. As shown in FIG. 1, this embodiment includes an annularly shaped, conical, concave recess formed on the underside 18b of the plate 18. In addition, an opposed guide surface is which is also annular and concave in configuration is mounted by means of resilient springs to the guide element 5. A plurality of bearing balls 20 are captured between the two concave, annular surfaces, which act as races. The spring biasing force provided by the spring 25 which supports the lower concave surface acts to center the guide element 5 into a predetermined rest position in the X-Y plane. In this way, the sensing pin 4 is always reset precisely to the zero point position of the X-Y coordinate system.

Of course, it should be understood that various changes and modifications to the preferred embodiment described above will be apparent to those skilled in the art. For example, a variety of resetting arrangements can be used as substitutes for the system illustrated in the drawings. It is therefore intended that the foregoing detailed description be regarded as illustrative rather than limiting, and that it be understood that it is the following claims, including all equivalents, which are intended to define the scope of this invention.

I claim:

1. In a multicoordinate sensing head comprising a sensing pin, a support member, and means for detecting deflection of the sensing pin, the improvement comprising:

means for defining a support surface fixedly secured with respect to the support member;
    a guide member secured to the sensing pin;
    means for guiding the guide member with respect to the support surface such that the guide member is movable with two degrees of translatory freedom over the support surface in a low friction, play-free manner;
    means for preventing the sensing pin from rotating with respect to the support member; and
    means for biasing the sensing pin into a predetermined rest position with respect to the support member, said biasing means comprising:
    first and second concave annular races, one of which is coupled to the support member, the other of which is coupled to the guide member;
    an array of balls captured between the two races; and
    means for biasing the two races together to bias the sensing pin to the rest position.

2. The invention of claim 1 further comprising:
    an axial guide fixedly mounted with respect to the guide member such that the axis of the axial guide is oriented perpendicular to the support surface and the sensing pin is guided for axial movement in the axial guide.

3. The invention of claim 1 further comprising:
    three position measuring systems, each coupled to the sensing pin to measure the position of the pin in a respective coordinate direction.

4. The invention of claim 3 wherein each of the position measuring systems comprises a respective photoelectric length measuring system.

5. The invention of claim 4 wherein at least two of the length measuring systems comprise a respective measuring scale, and wherein each of the measuring scales comprises a respective flat grid.

6. The invention of claim 1 wherein the rotation preventing means comprises a plurality of slide block guides.

7. The invention of claim 1 wherein the guiding means comprises a plurality of balls positioned between the support surface and the guide member.

8. The invention of claim 1 wherein the guide member defines a guide surface, and wherein the support surface of the support member and the guide surface are produced by optical surface forming methods.

9. The invention of claim 2 wherein the axial guide comprises a precision ball guide.

10. In a sensing head comprising a housing and a sensing pin, the improvement comprising:
- a support member secured to the housing and defining opposed planar and concave annular support surfaces;
- a guide collar which defines an annular, planar guide surface rigidly secured to the collar and an annular, concave guide surface resiliently secured to the collar;
- a first plurality of balls interposed between the planar support surface and the planar guide surface to guide the guide collar in two translatory degrees of freedom in a predetermined plane;
- a second plurality of balls interposed between the concave support surface and the concave guide surface such that the resiliently mounted concave guide surface captures the second plurality of balls against the concave support surface to bias the guide collar to a predetermined rest position;
- first and second position measuring systems for measuring the position of the guide collar in the predetermined plane;
- means for preventing rotation of the guide collar in the predetermined plane;
- an axial guide disposed in the guide collar such that the axis of the guide is oriented perpendicular to the predetermined plane and the guide surfaces surround the axial guide;
- said sensing pin guided for axial motion in the axial guide; and
- a third position measuring system for measuring the axial position of the sensing pin in the guide collar.

11. The invention of claim 11 wherein the first and second position measuring systems comprise respective flat grid scales.

* * * * *

UNITED STATES PATENT AND TRADEMARK OFFICE
CERTIFICATE OF CORRECTION

PATENT NO. : 4,530,159
DATED : July 23, 1985
INVENTOR(S) : Alfons Ernst

It is certified that error appears in the above-identified patent and that said Letters Patent is hereby corrected as shown below:

IN THE BACKGROUND OF THE INVENTION

In column 1, line 10, please delete "in" (second occurrence) and substitute therefor --to--;

In column 1, line 14, please delete "secondary" and substitute therefor --second--;

In column 1, line 39, please delete "," (first occurrence).

IN THE DETAILED DESCRIPTION OF THE
PRESENTLY PREFERRED EMBODIMENTS

In column 2, line 63, please delete "system" and substitute therefor --systems--;

In claim 11 (column 6, line 16), please delete "claim 11" and substitute therefore --claim 10--.

Signed and Sealed this

Fifth Day of April, 1988

Attest:

DONALD J. QUIGG

*Attesting Officer*      *Commissioner of Patents and Trademarks*